US012739025B2

(12) United States Patent
Bobrek et al.

(10) Patent No.: US 12,739,025 B2
(45) Date of Patent: Sep. 15, 2026

(54) METHOD FOR SIMULTANEOUS EQUALIZATION, FRACTIONAL DELAY AND FILTERING FOR COHERENT COMBINING OF DISTRIBUTED ANTENNA SIGNALS

(71) Applicant: Fairwinds Technologies, LLC, Annapolis, MD (US)

(72) Inventors: Pavlo Bobrek, Bradenton, FL (US); Keith Adams, Lake Ronkonkoma, NY (US)

(73) Assignee: Fairwinds Technologies, LLC, Annapolis, MD (US)

( * ) Notice: Subject to any disclaimer, the term of this patent is extended or adjusted under 35 U.S.C. 154(b) by 55 days.

(21) Appl. No.: 18/521,472

(22) Filed: Nov. 28, 2023

(65) Prior Publication Data

US 2025/0175244 A1 May 29, 2025

(51) Int. Cl.
*H04B 7/185* (2006.01)

(52) U.S. Cl.
CPC ................................ *H04B 7/18519* (2013.01)

(58) Field of Classification Search
CPC .......... H04B 7/18519; H04L 25/03044; H04L 25/03159; H04W 56/004
(Continued)

(56) References Cited

U.S. PATENT DOCUMENTS 6,067,319 A * 5/2000 Copeland .......... H04L 25/03057 375/348
6,215,354 B1 * 4/2001 Kolanek ............... H03F 1/3252 330/126

(Continued)

FOREIGN PATENT DOCUMENTS

CN 110 927 680 A 3/2020

OTHER PUBLICATIONS

Steiner Kyle et al, "Least-Squares Equalizer Demonstrations Using a Full-Digital . Bandwidth Sub-Nyquist-Sampled Wideband Beamformer on an RFSoC", IEEE Transactions on Aerospace and Electronic Systems, IEEE Service Center, Piscataway, NJ, US, vo 1. 58 , No. 6 , May 20, 2022 (May 20, 2022 ), pp. 5519-5532.

(Continued)

*Primary Examiner* — Emmanuel Bayard
(74) *Attorney, Agent, or Firm* — Laubscher & Fretwell, P.C.

(57) ABSTRACT

Systems and methods are provided that derive dynamically adjustable fractional delay, frequency equalization and bandpass filtering for coherent combining of distributed antenna signals. The systems and methods include functions that dynamically adjust the coefficients of a single filter component of a signal channel to adapt to current environment variables affecting signals both resident within a single channel and resident across multiple channels being combined. This includes measuring frequency response characteristics at an output of an intermediate frequency channel and deriving sets of coefficients. Each set of coefficients provides a unique delay that is a fraction of a sample clock period that when loaded in a digital filter induces a fractional delay in a signal being filtered by the digital filter. Preferably, weighted average filtering of equally spaced intermediate frequency spectral frequency measurements is included.

45 Claims, 5 Drawing Sheets

(58) Field of Classification Search
USPC ......................... 375/211, 232–233, 345, 350
See application file for complete search history.

(56) References Cited

U.S. PATENT DOCUMENTS

| | | | | |
|---|---|---|---|---|
| 7,388,910 | B2 * | 6/2008 | McKown | H04L 25/03019 375/232 |
| 7,876,835 | B2 * | 1/2011 | Kim | H03M 13/2792 348/611 |
| 8,605,843 | B2 * | 12/2013 | Dupont | H04L 27/2684 370/464 |
| 2005/0208898 | A1 * | 9/2005 | Wang | H04B 17/20 455/67.14 |
| 2008/0046492 | A1 * | 2/2008 | Sundstrom | G06K 7/0008 708/200 |
| 2010/0074348 | A1 * | 3/2010 | Xu | H04L 27/2665 375/260 |
| 2011/0200089 | A1 * | 8/2011 | Umeda | H04L 27/2647 375/232 |
| 2014/0029661 | A1 * | 1/2014 | Takaoka | H04L 25/03057 375/232 |
| 2016/0151045 | A1 * | 6/2016 | Pelissier | G01S 7/524 600/447 |
| 2020/0267030 | A1 * | 8/2020 | Imoto | H04L 25/03044 |

OTHER PUBLICATIONS

Deng T-B, “Closed-Form Design and Efficient Implementation of variable Digital Filters with Simultaneously Tunable Magnitude and Fractional Delay”, IEEE Transactions on Signal Processing, IEEE, USA, vol. 52, No. 6, Jun. 1, 2004 (Jun. 1, 2004), pp. 1668-1681.

* cited by examiner

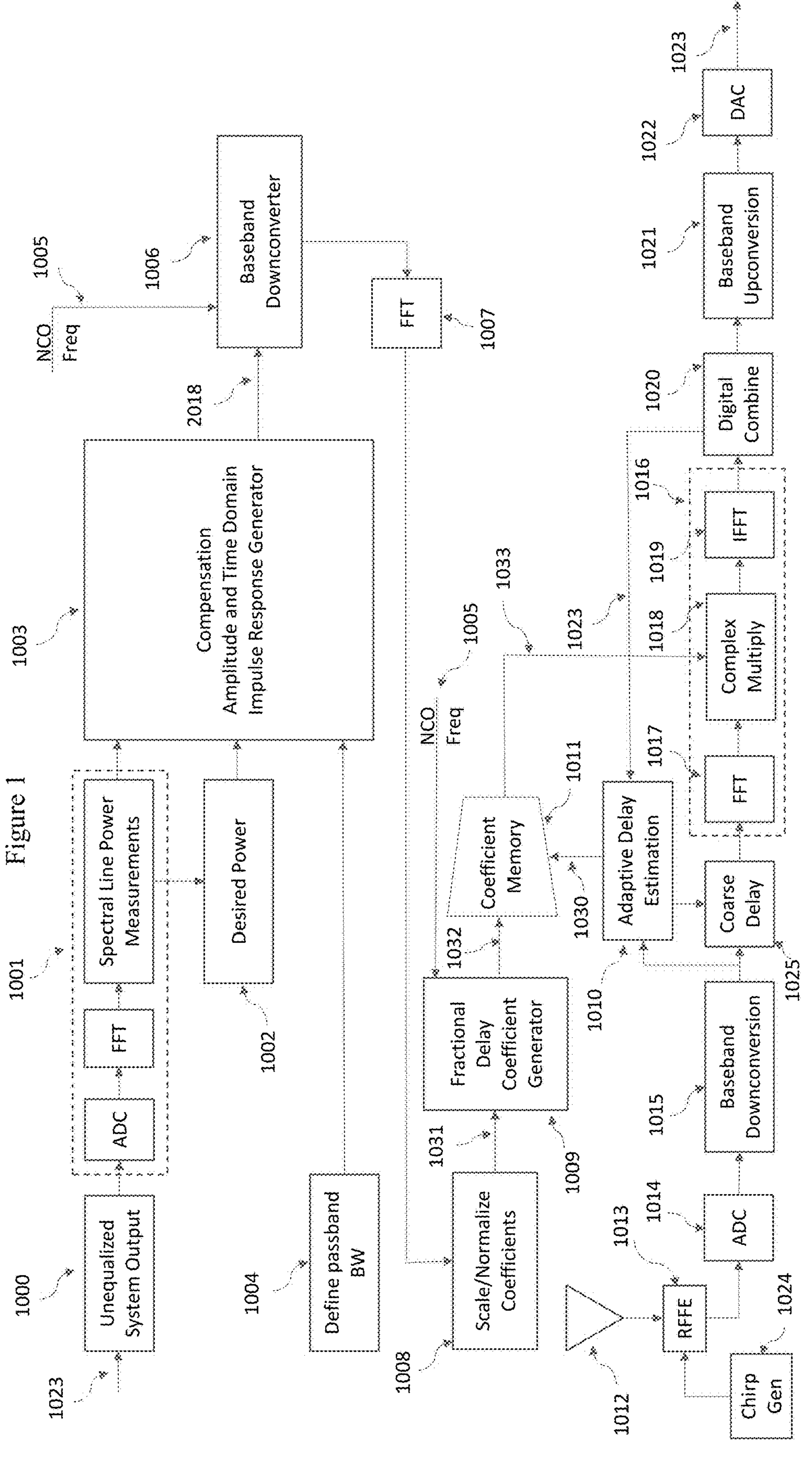
Figure 1
1023
1000
Unequalized System Output
1001
ADC
FFT
Spectral Line Power Measurements
Desired Power
1002
1003
Compensation
Amplitude and Time Domain Impulse Response Generator
1004
Define passband BW
2018
NCO Freq
1005
1006
Baseband Downconverter
FFT
1007
1008
Scale/Normalize Coefficients
1031
Fractional Delay Coefficient Generator
1009
1032
Coefficient Memory
1011
1030
1033
1023
Adaptive Delay Estimation
1010
1012
1013
RFFE
1024
Chirp Gen
1014
ADC
1015
Baseband Downconversion
Coarse Delay
1025
1017
FFT
1018
Complex Multiply
1019
IFFT
1016
1020
Digital Combine
1021
Baseband Upconversion
1022
DAC
1023

Avg Power / Pk Pow Freq 1
Avg Power / Pk Pow Freq 2
Avg Power / Pk Pow Freq N
Weighted Averager
Upper Exp Comp Weight
Freq 1 Comp Weight
Freq 2 Comp Weight
Freq M Comp Weight
Lower Exp Comp Weight
Sum
Define M
Weight Computation Algorithm (M/N)
Define passband BW
Derive M COS/SIN waves across channel BW
Derive Freq Separation
Window Function
2000
2001
2002
2003
2004
2005
2007
2008
2009
2010
2011
2012
2013
2014
2015
2016
2017
2018
1003

4000
4001
4002
FFT
4002
FFT
4003
Cross Correlation
4004
IFFT
4005
$I^2 + Q^2$ Squared Magnitude
4006
Max Detect Index
4007
Integrate and Dump
4014
4008
Secondary Filter
4009
MMSE Search Finite State Machine
4010
MSE Store
4011
4012
4013
1010

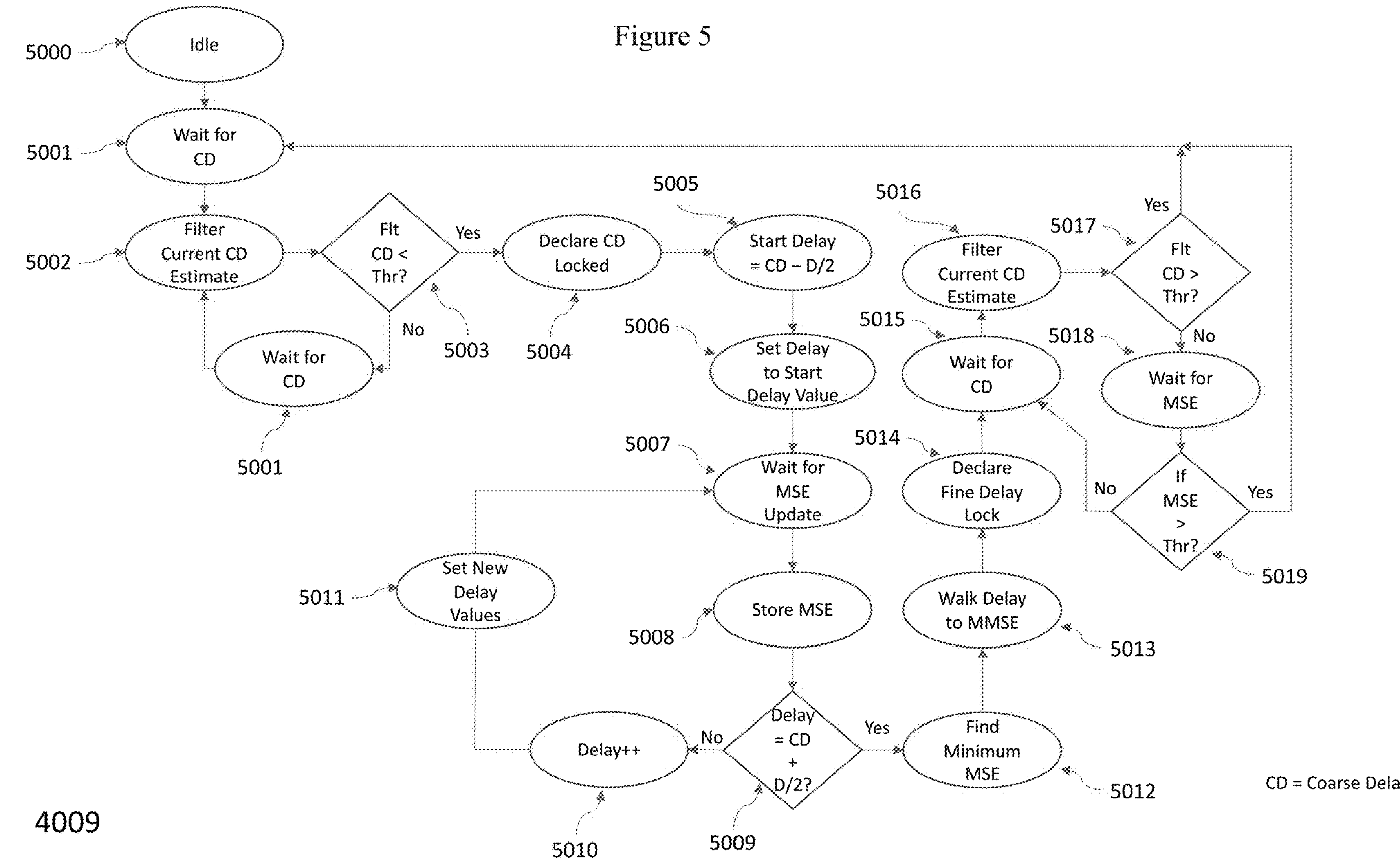
Figure 5
CD = Coarse Delay
Idle
Wait for CD
Filter Current CD Estimate
Wait for CD
Flt CD < Thr?
Yes
No
Declare CD Locked
Start Delay = CD – D/2
Set Delay to Start Delay Value
Wait for MSE Update
Store MSE
Delay = CD + D/2?
Yes
No
Delay++
Set New Delay Values
Find Minimum MSE
Walk Delay to MMSE
Declare Fine Delay Lock
Wait for CD
Filter Current CD Estimate
Flt CD > Thr?
Yes
No
Wait for MSE
If MSE > Thr?
Yes
No
5000
5001
5002
5001
5003
5004
5005
5006
5007
5008
5009
5010
5011
5012
5013
5014
5015
5016
5017
5018
5019
4009

METHOD FOR SIMULTANEOUS EQUALIZATION, FRACTIONAL DELAY AND FILTERING FOR COHERENT COMBINING OF DISTRIBUTED ANTENNA SIGNALS

BACKGROUND OF THE INVENTION

The present disclosure relates to methods and systems for coherently combined satellite signals that are created as a result of digitally combining signals from multiple distributed antenna arrays with the purpose of increasing the receive gain of a downstream receiver, such as a MODEM.

The signal to noise ratio of a signal received from a satellite is improved if the output of multiple antennas can be coherently combined. One such method to perform coherent combining is through adaptive phase alignment. An adaptive phase aligner will dynamically adjust the phase of two or more signals received from distributed antenna arrays and constantly measure the phase and/or frequency differences of each signal and correct them. Because distributed antennas may be located at various distances from the combiner, and/or generate signals from different pointing angles relative to the source satellite, signal delay, agnostic from the waveform phase, will be present.

In order to perform coherent combining, it is a requirement of the combining method to delay compensate the signals. The accuracy of the delay compensation is critical in order to ensure optimal combining, and thus, optimal receiver gain. This is especially important for high symbol rate carriers, as even small inter-channel delays can offset small symbol periods by large percentages, causing excessive inter-symbol interference in combine scenarios. The most basic form of inducing a delay in a digital application is by inserting a tapped shift register. This method will allow for variable delay with a delay resolution down to the clock period of the signal being processed. However, this resolution may not be sufficient for coherent combining.

An apparatus and method for coherent combining is disclosed in the Bobrek et al. U.S. Pat. No. 11,703,601, the entire content of which is incorporated herein by reference.

An innovation that allows for a finer delay resolution and thus, a more accurate delay compensation, includes employing fractional delay. Fractional delay approximates the amplitude of a waveform at the sample time defined by the sample clock, as though the waveform was delayed by less than the sample period. Interpolation of the waveform is used to achieve this fractional delay approximation.

A traditional method of performing fractional interpolation includes using a finite impulse response (FIR) filter. The typical application of a FIR filter is to convolve a time domain signal with a series of coefficients that represent the Fourier transform of the frequency weights that would be applied to the signal frequency components in the frequency domain (also known as the impulse response). Typically, FIR filters are implemented at baseband, using complex in-phase and quadrature (typically labeled I/Q) representations of the input time domain waveform. When a Fourier transform is applied to the complex time domain samples, a complex representation of the magnitude at each frequency component of the baseband spectrum can be realized. Each complex sample represents an instantaneous point around a unit circle. Because of this, a complex phase rotation can naturally be applied to each frequency domain weight. Thus, by performing complex filtering at baseband, phase offsets can be applied to the desired spectral weights in the frequency domain. By applying phase rotations in the frequency domain, a time shift occurs in the time domain.

Using this rationale, one mastered in the arts can appreciate that a small fractional delay can be realized.

Another consideration with distributed antenna combining for routing to one or more MODEMS is the need for the combined spectrum to not be impaired by the combine processing methodology, and for there to not be poor impedance matching in the transmission line. A byproduct of the digital processing of waveforms is the need to pass these waveforms between the analog and digital domains. The process of passing these signals can result in signal impairments, such as noise and frequency selective attenuation. As a result, a signal with a flat input spectrum may be altered after passing a signal through a system that performs digital combining.

To counteract frequency selective attenuation, equalization techniques may be applied. Equalization is the process of adding gain or attenuation to a set of frequency components to ensure that the overall frequency spectrum of an instantaneous band of interest has flat amplitude. Equalization is typically employed by measuring the spectral output of a system and adjusting the discrete frequency domain amplitudes to target a predetermined amplitude.

In order for a coherent combining system to maintain optimal combine processing, it is important for the noise bandwidth of a channel to be limited to the specific bandwidth being combined. This requires dynamically adjusting the processing bandwidth of the channel or channels being combined. To do this, bandpass filtering is typically employed.

While each of the fractional delay, equalizer and filtering for bandwidth limiting functions are common functions individually, it is much more efficient, as provided in this disclosure, to improve on their individual applications by merging them together into a single solution.

SUMMARY OF THE DISCLOSURE

Accordingly, it is an object of the present disclosure to provide methods to derive dynamically adjustable fractional delay, frequency equalization and bandpass filtering for coherent combining of distributed antenna signals.

The methodology includes a set of functions that are used to dynamically adjust the coefficients of a single filter component (per signal channel) to adapt to current environment variables affecting signals both resident within a single channel and resident across multiple channels being combined.

The methodologies focus on the derivation of the coefficients for a single digital filter apparatus that is present on each channel feeding a digital combiner. One embodiment of a digital filter includes the use of a finite impulse response digital filter, which will perform convolution on the time domain signals presented to it with a set of coefficients representing the impulse response of the intended frequency response. Another embodiment is the use of Fourier transforms to convert the time domain signal samples to the frequency domain. Within the frequency domain, weighting coefficients can increase or decrease the gain for each frequency component signal. The output of the signal weighting can be passed through an inverse Fourier transform to convert back to the time domain. The preferred embodiment for digital filtering referenced in this disclosure is the use of the Fourier transform, specifically, the Fast Fourier Transform (FFT).

The methodologies described herein are used to adaptively derive the coefficients for each filter of each channel within a digital combining system. As noted, the preferred embodiment of the digital filter will perform complex weighting in the frequency domain. Therefore, the functions derived as part of the methodology include a function for converting the outputs of a digital combiner from the time domain to the frequency domain.

From this frequency domain spectral response of the channel, a function that derives compensation power is utilized to create the compensation weights for each spectral component. The outputs of this compensation function are then downconverted from the system output passband to baseband. A function that normalizes and scales the downconverted compensation coefficients is utilized. The normalized/scaled compensation coefficients are passed to another function that creates similar coefficient sets that will result in a fractional delay when loaded into the digital filter. Those sets of coefficients are then stored.

Another component of the methodology is the adaptive delay estimation which is used to dynamically select a specific set of coefficients to be loaded into each channel of the digital combiner. The selected set of coefficients will in turn adjust the mean squared error between the digital combiner channels. The mean squared error will be measured by the adaptive delay estimation function, which may result in an updated selection of coefficients. The adaptive delay function will update the sets of coefficients until the minimum mean squared error is realized.

The apparatus implementing the methodology described herein can be executed in a continuous manner, or during specific periodic intervals during digital combiner operation. At a minimum, the apparatus is preferably executed at system initialization. Once a minimum mean squared error has resulted, the minimum mean squared error is recorded. A component of the methodology will be to monitor the mean squared error, in real-time. If the difference between the real-time mean squared error and the stored minimum mean squared error exceeds a predefined threshold during system operation, the adaptive delay estimation is then re-executed.

It is also an object of the present disclosure to provide a system configured to generate the coefficients for a digital filter that concurrently performs bandlimiting, channel frequency equalization and fractional delay compensation. The system includes an intermediate frequency spectral measurement module as well as a fractional delay coefficient generator. The module measures the frequency response characteristics at an intermediate frequency channel output and the generator derives sets of coefficients, each set providing a unique delay that is a fraction of a sample clock period. When loaded in a digital filter, the sets of coefficients induce a fractional delay in the signal being filtered while unaltering the equalizing and bandlimiting properties of the filter. Preferably, the intermediate frequency spectral measurement module includes weighted average filtering of equally spaced intermediate frequency spectral measurements.

In one embodiment, the system further includes an intermediate frequency channel frequency response selector module for equalization and bandlimiting.

In a second embodiment, the system further includes a frequency response compensation coefficient module. This calculates a set of frequency response compensation coefficients to compensate for the discrepancy between the measured and desired intermediate frequency response, including equalization and bandlimiting.

In another embodiment, the system further includes a compensation amplitude and time domain impulse response generator to equalize the channel. A baseband downconverter translates an impulse response generated by the generator from the passband to 0 Hz.

In yet another embodiment, a coefficient memory selects a set of coefficients to be used to create the desired fractional delay.

In a further embodiment, the compensation amplitude and time domain impulse response generator include a time domain sinusoid module for constructing a set of complex time domain sinusoids to represent the equalization and bandlimiting frequency response adjustments. The time domain sinusoid module preferably includes a window function to weight the set and time and bandwidth limit each sinusoid. This module is configured to add complex time domain sinusoids within the intermediate frequency passband band and at the passband edges to adjust the characteristics of the transitions to the stopbands.

In another embodiment, the compensation amplitude and time domain impulse response generator include an adder to sum the set of weighted complex sinusoids to produce an intermediate frequency passband impulse response.

In an additional embodiment, the system further includes a transformation module to transform the time domain impulse response at 0 Hz to the frequency domain to have a set of baseline frequency response compensation coefficients that equalize the existing intermediate frequency passband frequency response to be the desired baseline frequency response. The system also preferably includes a fractional delay coefficient generator for deriving sets of frequency domain coefficients from baseline frequency response compensation coefficients. Each set has a delay specified as a fraction of a sample clock period and is configured such that a desired baseline frequency response of the channel is unaltered.

The above embodiments may preferably further include a digital filter configured with the set of fractional delay compensation coefficients selected by an adaptive delay estimator. The digital filter is configured to use complex frequency domain coefficients to compensate for impairments of signals that pass through the digital combining system.

It is further an object of the present disclosure to provide a system for dynamically tracking and compensating for delay variations between two channels that are to be coherently combined. This improves the signal to noise ratio for downstream receiving modems. The system includes an adaptive delay estimator to provide a coarse delay estimate between two input channels of a digital combiner. The adaptive delay estimator is preferably configured to output coarse and fine delay settings, and the coarse delay is the number of sample clock periods of delay. The fine delay setting includes one set of fractional delay coefficients selected from multiple sets of fractional delay coefficients stored in coefficient memory.

In one embodiment of this system, the adaptive delay estimator is further configured to search for the set of fractional delay filter coefficients that are proximate a coarse delay estimate that minimizes the mean squared error between two channels to be combined. The adaptive delay estimator is also preferably configured to combine coarse delay and fine delay settings to update a mean squared error measurement from the digital combiner and minimize the minimum mean squared error. The adaptive delay estimator may also be configured to track updated coarse delay estimates and mean squared error measurements after the minimum mean squared error has been computed to adapt delay adjustments and maintain minimum mean squared error.

Preferably a digital filter is configured with the set of fractional delay compensation coefficients selected by the adaptive delay estimator. The digital filter is configured to use complex frequency domain coefficients to compensate for impairments of signals that pass through the digital combining system.

BRIEF DESCRIPTION OF THE DRAWINGS

The invention will be explained in greater detail below using embodiments with the aid of the accompanying figures in which:

FIG. 1 is a schematic of one embodiment of a methodology for adaptively deriving the coefficients for a digital filter;

FIG. 5 is a flow chart representing one embodiment of the MMSE search finite state machine.

DETAILED DESCRIPTION

Figure 2:
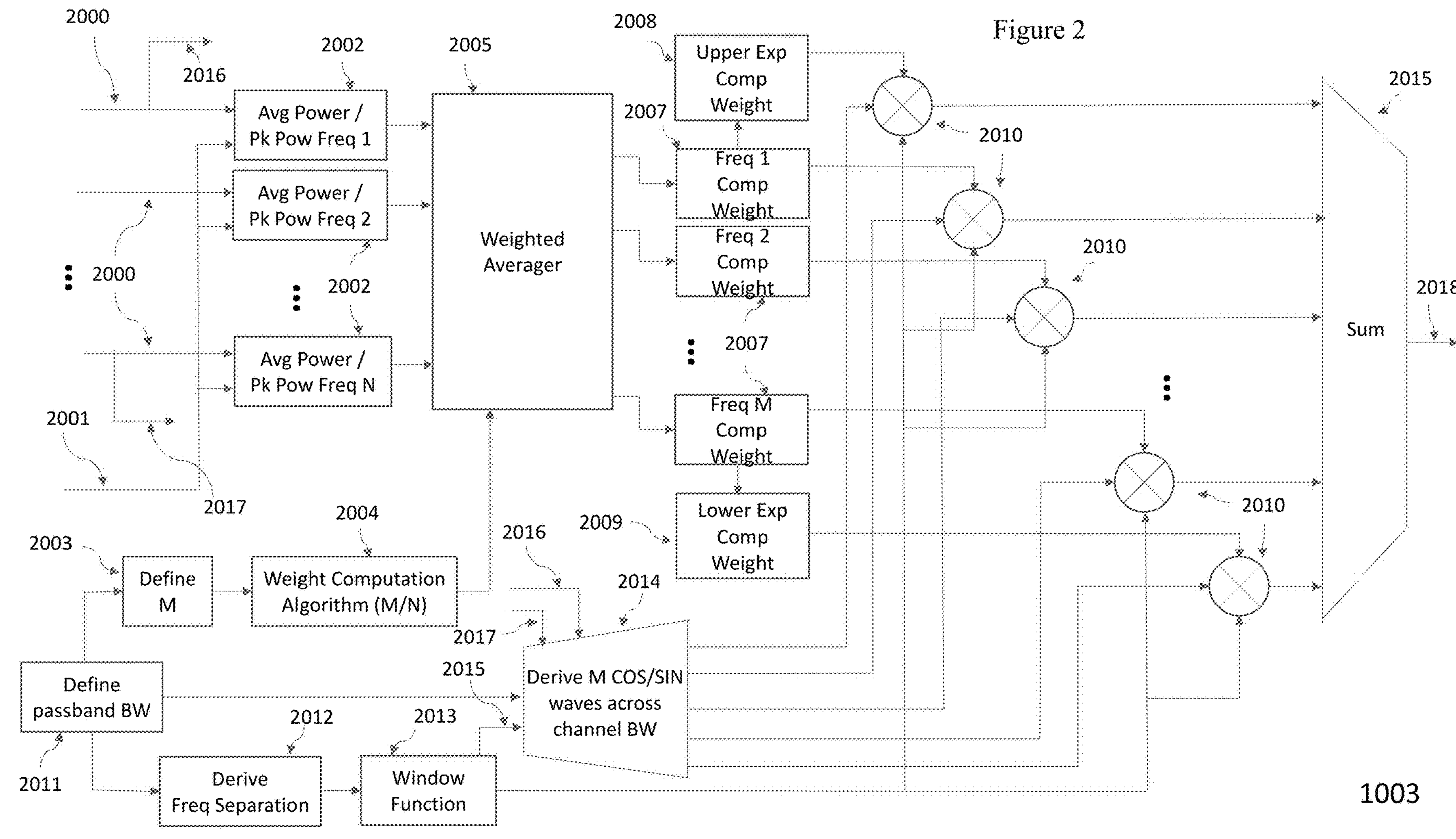
FIG. 2 is a schematic of one embodiment of a computation of frequency equalization coefficients and method to introduce bandlimiting.

In the following description, for the purposes of explanation, numerous specific details are set forth to provide a thorough understanding of the technology described herein. It will be evident to one skilled in the art, however, that the exemplary embodiments may be practiced without these specific details. In other instances, structures and devices are shown in diagram-form to facilitate description of the exemplary embodiments.

The exemplary embodiments are described below with reference to the drawings. These drawings illustrate certain details of a specific embodiment that implement the module, method, and computer program product described herein. However, the drawing should not be construed as imposing any limitations that may be present in the drawing. The methods and computer program product may be provided on any machine-readable media for accomplishing their operations. The embodiments may be implemented using an existing computer processor, or by a special purpose computer processor incorporated for this or another purpose, or by a hardwired system such as a field programmable gate array (FPGA), or by an application specific integrated circuit (ASIC).

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general-purpose computing device in the form of a computer, including a processing unit, a system memory, and a system bus, that couples various system components including the system memory to the processing unit. The system memory may include read only memory (ROM) and random-access memory (RAM). The computer may also include a magnetic hard disk drive for reading from and writing to a magnetic hard disk, a magnetic disk drive for reading from or writing to a removable magnetic disk, or an optical disk drive for reading from or writing to a removable optical disk such as a CD-ROM or other optical media, or a flash memory drive for reading from or writhing to a fixed or removeable flash memory device. The drives and their associated machine-readable media provide nonvolatile storage of machine-executable instructions, data structures, program modules and other data for the computer.

The device of the invention includes an apparatus and methods that are designed to be used to simultaneously equalize, bandwidth limit and delay signals across different channels that are then presented to a digital combiner. The present disclosure focuses on the methodologies required to equalize a signal path while simultaneously delaying the signals prior to digital combining in order for the combine signal to exhibit the maximal receiver gain possible, while ensuring broadband spectral response are sufficiently filtered to a limited instantaneous bandwidth within the Nyquist band.

Referring to FIG. 1, the present disclosure provides both the scope of a digital combining system as well as the functions defining the methodologies claimed by the invention. A consideration of this disclosure is a means to receive radio frequency (RF) signals from an antenna 1012 in the form of a frequency division multiplex (FDM) consisting of multiple subcarriers, for example, signals received from the same satellite source. The FDM is down-converted by a mixer contained within the channel's antenna and input into a radio frequency front end (RFFEs) 1013 which filters the antenna's output into an intermediate frequency (IF) band, for example, to L-band with a frequency range of 900 MHz to 2000 MHz. Another element of the RFFE is the provision of a switch used to pass a linearly swept sinusoid (called a chirp) from generator 1024 out of the RFFE instead of the IF from the antenna. The use of the chirp is for calibration of the equalization through the system and is selected by the digital combiner's system controller (not pictured) at system initialization.

The L-Band IF is input to an analog-to-digital converter (ADC) 1014. The ADCs digitize their inputs and present them to a baseband downconverter 1015 which digitally down converts the IF signal and decimation filters the baseband band of interest to create a complex I & Q signal pair. The output of the decimation filters are provided to a coarse delay function 1025 used to perform delays at the resolution of the system sample clock, which is typically implemented with a tapped shift register. The output of the coarse delay function is then presented to a digital filter 1016. The output of the digital filter 1016 provides improvements to the channel impairments induced on the baseband I & Q signal pair.

The preferred embodiment of the digital filter for operation with the coefficients derived from the presented invention is the use of a Fast Fourier Transform (FFT) 1017 and inverse FFT (IFFT) 1019 pair with a complex multiplier 1018 between them. Those knowledgeable in the art will recognize that the output of the FFT is a set of complex numbers representing the I & Q signal for a unique frequency component within the band of interest of the input signal. The preferred filter architecture requires complex coefficients that scale each frequency component by the corresponding weight represented by the coefficient. Disclosed herein are the details of the full methodology used to derive these coefficients. After complex multiplication of the coefficients with the FFT outputs, the frequency domain I & Q data is converted back into the time domain by way of the IFFT.

For a digital combining system, a digital combiner 1020 is provisioned after the digital filter. The digital combiner adaptively adjusts the phase and frequency offsets of the input I & Q signals for 2 or more channels presented to it. A consideration of the digital combiner is that signal impairments such as relative delay, frequency selective degradation and out of band interferes are properly mitigated prior to the digital combining process in order for the digital combiner to generate an output with the optimal possible gain. Another consideration of this disclosure is that the digital combiner will derive the mean squared error between the digitally combined channels. The mean squared error (MSE) is a measure of the average of the sum of the square of the difference between the channels prior to combining, but after phase rotation. The MSE metric is used by the methodology in this disclosure to aid in realizing the fine delay offset.

After generation of a digitally combined I & Q baseband signal, the complex samples are presented to a digital upconverter 1021 which upconverts the baseband samples back to IF using a complex mixer and interpolation filter. The upconverted real samples are then presented to a digital-to-analog converter 1022.

The functions defined hereinafter represent an embodiment of the invention claimed in this disclosure. A consideration of the methodology in this disclosure is the equalization of the path through the digital combiner system. In order to equalize the path, it is necessary to feedback the real analog IF signal 1023 generated from the digital combiner in order to derive compensation. It is necessary for the system controller to command the RFFE 1013 to pass the chirp 1024 to the system for a fixed period of time after system initialization to derive a baseline set of equalization coefficients for the digital filter. The unequalized system output 1000 is presented to a spectral measurement function. One embodiment of a spectral measurement function 1001 is presented with a digitization function such as an ADC which presents a digitized set of samples representing the output signal of the digital combiner system to a dense FFT function; ideally with several thousand points. The frequency component outputs of the FFT are then presented to a spectral peak power measurement function. The spectral peak power measurement function takes the complex FFT outputs, squares them and scales them to relate them to a single peak absolute power measurement, per frequency component. The power measurements are linear, as opposed to logarithmic.

The spectral power measurements are presented to two additional functions that compose the methodology. The first function is the desired power measurement 1002. One embodiment of the desired power is to take the average of the power measurements in which all of the power measurements for each frequency component are summed and divided by the number of frequency components. The average power measurement, along with the spectral peak power measurements are then presented to the compensation amplitude derivation function 1007. In conjunction with the average power and peak power measurements, an integer value representing the passband bandwidth of the channel 1004 is presented to the compensation amplitude and time domain impulse generator. This integer can be derived from a memory, or dynamically adjusted by a system controller within software or firmware for adapting to frequency division multiplexed environments or even narrowband single carrier environments.

Referring to FIG. 2, a preferred embodiment of the compensation amplitude and time domain impulse response generator is shown. The peak power for each frequency component 2000 is passed to a divider 2002 used to divide the desired power 2001 by the peak power for each frequency component. This results in N compensation power measurements, which is the target weight of the coefficient for that frequency component. In order to derive coefficients for a filter, it is necessary to reduce the number of spectral measurements to a number that is proportional to the theoretical Nyquist bandwidth of the channel being equalized. This is generally equal to the net baseband sample rate.

Another element of the innovation presented in this disclosure is the generation of the coefficients from the compensation power weights. Because the digital filter used to provision the equalization, bandwidth limiting and fractional delay is performed at baseband, a translation methodology is required from IF back to baseband. The innovation described herein utilizes the summation of a series of complex cosine/sine waves 2014 to derive a time domain representation of the compensation spectral weights resulting from the divider 2002.

It is a necessary consideration of the methodology described to define the number of unique cosine/sine frequencies that will be summed. The number of discrete frequencies (defined as M) that will be derived will be based on the desired 3 dB bandwidth of the digital filter response. The 3 dB bandwidth will be loaded into a function 2011 by the system controller. When the system controller defines this filter bandwidth, the number of frequencies (M) can be generated by a function 2003 that derives the product of a scalar and the quotient of the system controller defined filter bandwidth and half of the full Nyquist frequency. For the purposes of the innovation described in this disclosure, the scalar is 16, however, this scalar can be adjusted to be based on the order of the digital filter to improve system performance.

Based off of the number of frequencies that will be used to derive the cosine/sine series, a function that derives the frequency separation 2012 can be defined as the ratio of the 3 dB bandwidth to the number of frequencies. This frequency separation is used to derive the size of the window used to shape each cosine/sine wave. The gaussian window generation function 2012 2013 will derive the window over a size derived by the ratio of the period of the frequency separation to the period of the spectrum analyzer sample rate. This size of the window 2015 is passed to the cosine/sine generation utility 2014, along with the bandwidth from function 2011 and the outer band edge frequencies 2016 and 2017 from the spectral sample data inputs.

Another consideration of the cosine/sine generation is how the weighting of the unequalized spectrum is factored into the time domain output. Given that M unique cosine/ sine frequencies will be derived, it will be necessary to reduce the N spectral weights down to M weights. This is accomplished by filtering the array of weights by a ratio proportional to N over M. A function 2004 implements a set of weighting coefficients used to reduce the number of frequency samples N to M frequency samples. The coefficients from this function 2004 are passed to a weighted averager 2005 that will perform a weighted average to merge a number of adjacent frequency measurements to M reduced number of frequency measurements across the band. The resulting M compensation weights 2007 of the weighted averager are then expanded by an expansion factor. The intent of the expansion factor is to provision weights for the transition bands so as not to create a broadband signal with a sharp falloff transient. The expansion weights 2008, 2009 are derived from the outer weights of the spectral weighting measurements. It should be noted that the same expansion factor is used to derive additional cosine/sine frequencies outside of the outer band edges in 2014.

An array of complex sinusoids 2014 composed of cosine and sine waves is constructed with frequencies centered at chosen intervals across the band of interest (including the expansion band edges). Each complex sinusoid is multiplied 2010 by a window function 2013, for example, a gaussian window. A unique compensation weight 2007, 2008 and 2009, using a single scalar, adjusts the amplitude of each windowed complex sinusoid. This serves to provide equalization over the frequency band of interest. The output of each multiplier 2010 is summed 2015 on a sample-by-sample basis. The output is a time domain signal representing the impulse response of a broadband signal with the spectral response of the compensation weights.

Referring back to FIG. 1, the output time domain impulse response from the compensation amplitude derivation function 2018 is passed to a baseband downconverter 1006. The baseband downconverter uses a numerically controlled oscillator (NCO) frequency 1005 to downconvert the center of the IF spectrum of interest to 0 Hz. By using the center frequency of the IF spectrum, the downconverter will center the spectrum at 0 Hz.

The output of the downconversion stage is next passed to an FFT block 1007, which produces a frequency domain representation of the downconverted impulse response. The output of the FFT is provided to a scaling and normalization block 1008, which translates floating-point coefficients to fixed-point for use by the digital filter. It also allows for normalization of the coefficient gains to maintain unity gain through the digital filter.

The output of the scaling and normalization function 1008 represents a baseline set of coefficients for equalizing the channel within the finite bandwidth specified by the system controller. This set of baseline coefficients are presented to a fractional coefficient generator 1009 that will derive D sets of coefficients that will induce delays of less than one sample clock. The preferred implementation uses a value of D equal to 16, providing a set of delay increments that are the sample period divided by 16. However, the same mechanics of the innovation will apply to larger or smaller values of D.

Figure 3:
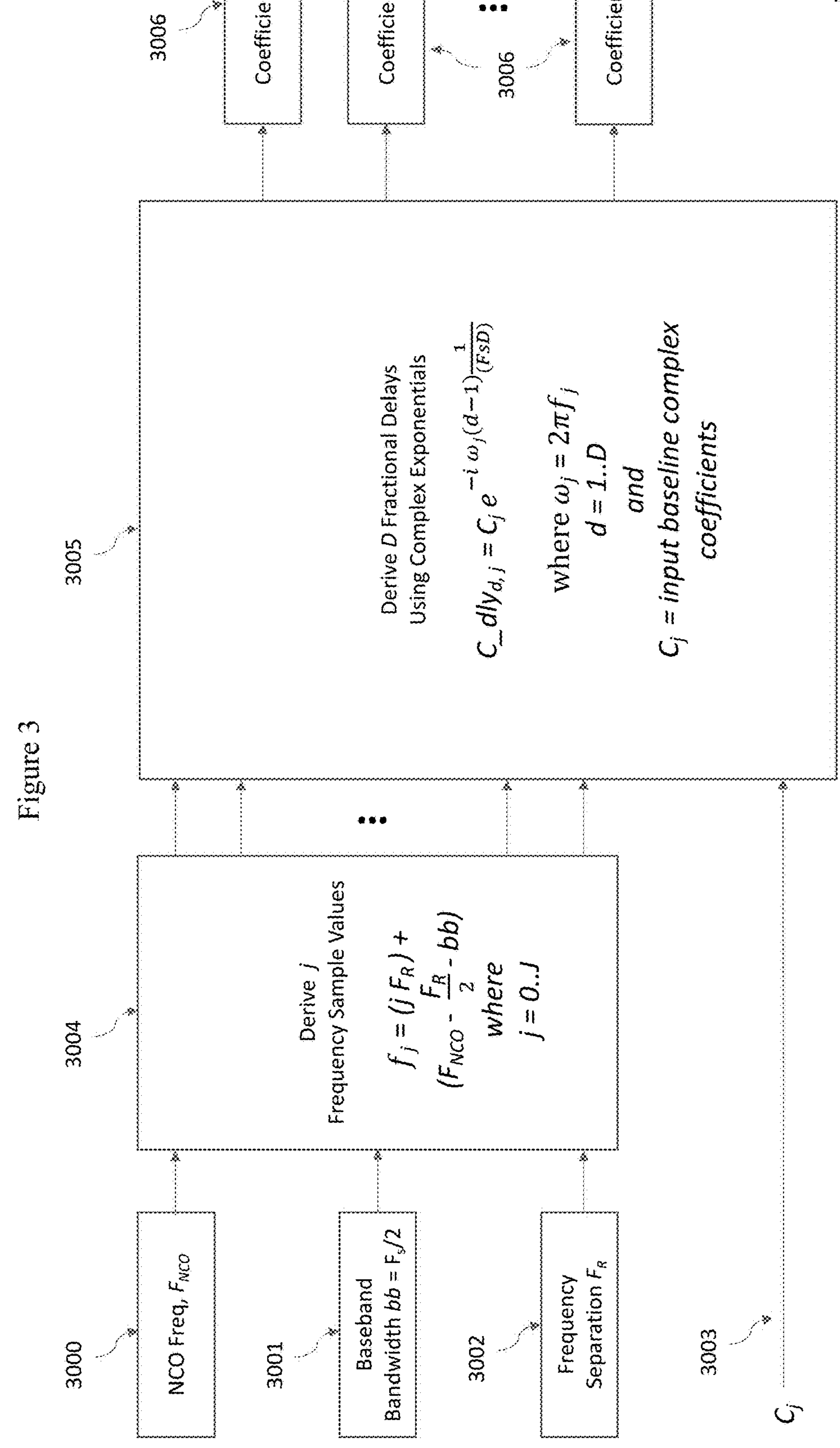
FIG. 3 is a schematic of a fractional delay coefficient generator used to derive sets of coefficients based off of an equalized, bandlimited set of baseline coefficients.

FIG. 3 depicts a preferred embodiment of the fractional delay coefficient generator 1009. There are two major components for consideration of the fractional delay coefficient generator. The frequency generator 3004 enumerates J frequency values which have a one-to-one correspondence to those used by the frequency domain digital filter 1018. To do this, the NCO frequency 3000 is at the center frequency of the processed IF band. The frequency values generated from the frequency generator 3004 are derived from the baseband bandwidth 3001 and the frequency offset resolution 3002. The baseband bandwidth is equal to the sample frequency divided by 2 while the number of frequency samples is equal to J, while the separation between frequency samples is equal to the sample frequency divided by J. In order to provide the same number of frequency samples on either side of the NCO frequency, an offset is added to each frequency sample value equal to half the frequency separation. The preferred embodiment of the frequency sample value generator implements the formula 3004 defined in FIG. 3:

$$f_j = (jF_R) + \left(F_{NCO} - \frac{F_R}{2} - bb\right)$$

where $$j = 0 \ldots J$$

With the NCO Frequency 3000, the baseband bandwidth 3001 and the number of frequency samples 3002, the frequency sample value generator 3004 will derive J frequency values as the sum of an incremental frequency separation (frequency separation incremented from 0 to J−1) and the difference between the NCO frequency, half the frequency separation and the baseband bandwidth.

The second component of the fractional delay coefficient generator is the complex exponential generator 3005. The complex exponential generator computes D sets of J coefficients. Each of the D sets of fractional delay coefficients are obtained by multiplying each element of the vector of J baseline coefficients by a unique complex number that represents the phase shift that would be incurred by the corresponding frequency component at the specified fractional delay, when upconverted back to the IF passband. The preferred embodiment of the complex exponential generator is to implement the formula 3005 defined in FIG. 3:

$$\text{C\_dly}_{d,j} = C_j e^{-i\omega_j(d-1)\frac{1}{(FsD)}}$$

where $$\omega_j = 2\pi f_j$$

$$d = 1 \ldots D$$

and $$C_j = \text{input baseline complex coefficients}$$

Using the defined formula, the result of the complex exponential generator will be an array of J×D complex numbers.

Referring back to FIG. 1, the output of the fractional delay coefficient generator 1009 will be an array of coefficients formatted for loading into the digital filter 1016. A set of registers or memory locations store the D sets of J coefficients. A coefficient memory 1011 is used to select one set of the D sets of fractional delay coefficients corresponding to the delay specified by the adaptive delay estimator 1010, which controls coefficient memory 1011.

The adaptive delay estimator 1010 continuously monitors the changes in relative delay between two input channels and selects the coarse delay and the set of fractional delay coefficients best suited to compensate for the estimated delay. The adaptive delay estimator 1010 first determines a coarse delay, which is the number of sample clock periods between two channels. Following coarse delay estimation, a fine delay is determined by searching for which fractional delay coefficients result in the minimum mean squared error (MMSE) 1023 between the two channel signals that are to be digitally combined.

Figure 4:
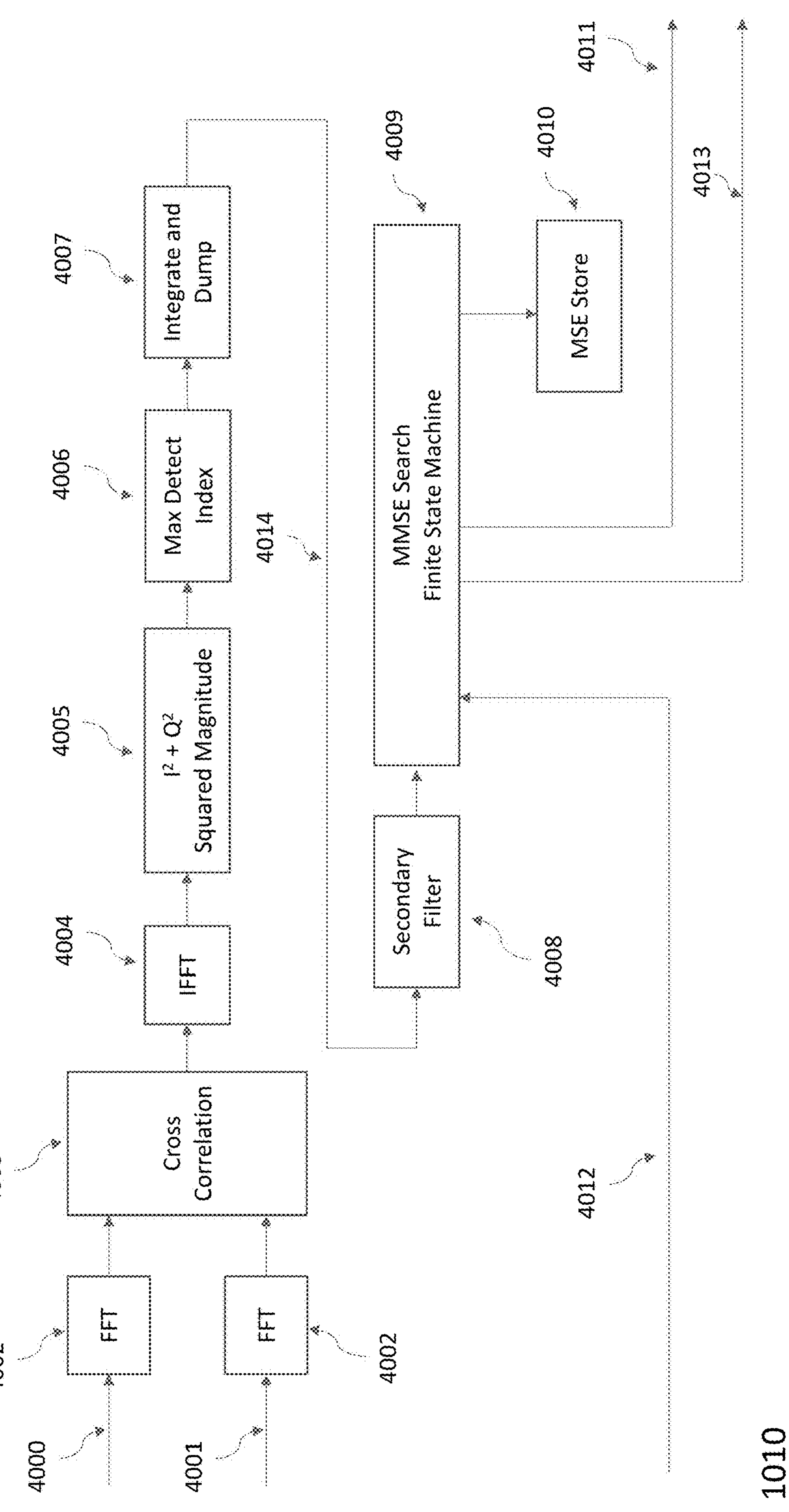
FIG. 4 is a schematic of one embodiment of an adaptive delay estimation function.

Referring to FIG. 4, a preferred embodiment of the adaptive delay estimation function 1010 is shown. The input signals 4000, 4001 represent the signals from two channels that are being digitally combined downstream of the functions in FIG. 4. The signals for each path 4000, 4001 are passed into an FFT function 4002 to convert the time domain signals to the frequency domain.

The frequency domain results of each FFT are then passed to a cross correlation function 4003. The cross correlation function performs a sample-by-sample complex product of the FFT to create a frequency domain representation of the time domain cross correlation.

The output of the cross correlation function is passed to an IFFT function 4004 to obtain the time domain representation of the cross correlation.

The max detect index function 4006 determines the sample index of the maximum squared magnitude 4005 of the IFFT output, which corresponds to the coarse delay between two channels.

Multiple samples of the max detect index 4006 output are averaged using an integrate and dump filter 4007, in order to reduce the variance of the computed index. The integrate and dump will accumulate each update of the max detect index. After several thousand updates, the accumulated value is divided by the number of updates accumulated. After the integrate and dump output is updated, the accumulator is reset to zero.

The preferred embodiment of the adaptive delay estimator will add additional filtering 4007 to the output of the integrate and dump. The additional filter is used to determine if the coarse delay measurement is stable for a fixed amount of time using compares and a digital delay line storing values over a fixed interval. This qualification is used to assert a flag to the fine search finite state machine (FSM) 4009 that is used to detect the fine delay between the channels. Aside from the secondary filter coarse delay measurement, the fine search FSM 4009 relies on the MSE input 4012 for its decision processing and outputs both a fractional delay coefficient memory control selection 4011 and a coarse delay value 4013 to the coarse delay function (FIG. 1, 1025). An MSE memory 4010 stores a set of MSE measurements which are searched to determine the MMSE and its associated set of fractional delay coefficients.

Referring to FIG. 5, a flow diagram describing the functional processing of the fine search FSM 4009 is shown. The fine search algorithm is continuously running through system operation to monitor changes in the state of the channel based on two measurements: coarse delay and MSE.

After system power-on reset, the FSM 4009 will be in the Idle 5000 state and transitions to a coarse delay (CD) detection wait state 5001. Upon each update of the integrate and dump filter output (4007 from FIG. 4), the stability filter 4008 from FIG. 4 will be updated and controlled 5002. A stability threshold is checked against the output of the secondary filter in state 5003. If the filter output exceeds the stability threshold, the FSM 4009 will transition back 5001; otherwise, a coarse lock is declared 5004 and the coarse acquisition mode is considered complete. States 5001, 5002, 5003 represent the coarse acquisition mode of the search algorithm.

Upon coarse lock declaration, the search for the minimum MSE starts by deriving an initial delay based off of the CD. The initial delay is based off of the number of fractional delays, D. The search methodology presented assumes that the coarse delay is accurate to within one sample clock period. The fractional delay search range is from CD−(D/2) to CD+(D/2). The next state 5005 selects the start delay value to be CD−(D/2). State 5006 determines the coarse delay setting (FIG. 1, 1025) and selects the fractional delay coefficients using the coefficient memory (FIG. 1, 1011). The result is an induced fine resolution delay on one of the channels to be digitally combined relative to the other channel. Because it is desirable to not introduce a large shift in delay in an abrupt manner, state 5006 walks the fractional delay setting, in increments of 1/D of the sample clock period from its initial delay to the intended start delay. A typical increment rate is related to the tracking loop filter bandwidth of downstream equipment to minimize disruption to allow it time to continue tracking.

Once the start delay is reached, the FSM 4009 will wait for an updated MSE 5007. The FSM 4009 will then store the MSE 5008 in the MSE memory 4010 (FIG. 4). Next, the FSM 4009 checks if the current target delay has reached CD+(D/2). If not, the FSM 4009 increments the delay 5010 by 1/D of the sample clock period and sets the new delay 5011. The FSM 4009 will iteratively repeat the process of incrementing the delay, waiting for the MSE update, then storing the MSE corresponding to that delay and then checking if the current delay has reached CD+(D/2).

Once it is detected the current delay is set to CD+(D/2) 5009, the decision on the minimum MSE can be made 5012 based on the stored results. Once the MMSE has been detected, the corresponding fine delay is walked (i.e. slowly incremented in steps of 1/D of the sample clock period) to its final value in state 5013 in the same manner as performed by state 5006. After the fine delay has been reached, the fine delay lock is declared 5014.

The FSM 4009 now enters a tracking mode (states 5015, 5016, 5017 5018, 5019). The tracking mode 5015, 5016, 5017 5018, 5019 intends to monitor both the CD and the MSE. State 5015 waits for an updated CD from the integrate and dump 4007. The secondary filter 5016 is updated with the current CD. State 5017 will compare the filtered CD from the secondary filter 5016 against the stability criteria. If the filtered CD 5016 exceeds the stability criteria, the FSM 4009 will return to the acquisition mode 5001. If not, a state to wait for an updated MSE 5018 is executed. If the newest MSE subtracted from the MMSE exceeds a threshold 5019, then the FSM 4009 returns to the acquisition state 5001. When the difference between the MMSE and the current MSE is below the MSE threshold, then the FSM 4009 will return to 5015 and continue traversing the tracking mode states 5015, 5016, 5017 5018, 5019.

By continuously engaging in tracking mode monitoring, the digital filter can adapt to continuously changing delays and update the coarse and fractional delays, as necessary, to minimize MSE, which optimizes the coherent combining gain downstream receivers will realize, all while maintain an equalized, bandlimited channel.

What is claimed is:

1. A method for generating the coefficients for a digital filter implemented on each channel of a multi-channel digital coherent combining system that concurrently performs bandlimiting, channel frequency equalization and fractional delay compensation including:

(a) measuring frequency response characteristics at an output of an intermediate frequency channel within the coherent combining system via an intermediate frequency spectral measurement function;

(b) deriving a first set of coefficients to bandlimit and equalize the intermediate frequency channel spectral measurement;

(c) deriving subsequent sets of coefficients based on the first set via a fractional delay coefficient generator, each subsequent set providing a unique delay per channel of the coherent combining system that is a fraction of a sample clock period that when loaded in the digital filter induces a fractional delay in a signal being filtered by the digital filter, unaltering the equalizing and bandlimiting properties of the first set of coefficients; and (d) selecting an incremental delay that optimizes a signal-to-noise ratio when signals from different antennas are coherently combined.

2. The method of claim 1 wherein the measuring step includes weighted average filtering of equally spaced intermediate frequency spectral frequency measurements, each measurement acting on unique intermediate frequency signals specific to each channel of the coherent combining system.

3. The method of claim 2 wherein a desired intermediate frequency channel frequency response is included for purposes of equalization and bandlimiting.

4. The method of claim 3 and further including deriving a set of time domain impulse response via equalization and bandlimiting of a frequency response adjustment to compensate for a discrepancy between an existing intermediate frequency channel response output and a desired baseline frequency response.

5. The method of claim 4 and further including generating the time domain impulse response of the frequency domain compensation amplitudes to equalize the channel.

6. The method of claim 5 and further including translating the generated impulse response from passband to 0 Hz via a baseband downconverter.

7. The method of claim 1 and further including selecting the set of coefficients to be used to create the fractional delay via coefficient memory.

8. The method of claim 4 and further including constructing a set of complex time domain sinusoids to represent the equalization and bandlimiting frequency response adjustments.

9. The method of claim 8 and further including weighting the set of complex time domain sinusoids via a window function to time and bandwidth limit each sinusoid.

10. The method of claim 8 and further including adding complex time domain sinusoids at intermediate frequency passband band edges to adjust characteristics of transitions to stopbands.

11. The method of claim 10 wherein the set of weighted complex sinusoids are summed to produce an intermediate frequency passband impulse response.

12. The method of claim 6 and further including transforming the time domain impulse response at 0 Hz to the frequency domain resulting in a set of baseline frequency response compensation coefficients used to equalize the existing intermediate frequency passband frequency response to be the desired baseline frequency response.

13. The method of claim 12 wherein deriving sets of coefficients via the fractional delay coefficient generator includes deriving frequency domain coefficients from the baseline frequency response compensation coefficients, each set having a delay that is a fraction of the sample clock period and not altering the desired baseline frequency response of the channel.

14. The method of claim 1 and further including configuring a digital filter with a set of fractional delay compensation coefficients selected by an adaptive delay estimator.

15. The method of claim 14 and the digital filter compensates for impairments of the signals that pass through the digital coherent combining system via complex frequency domain coefficient.

16. The method of claim 14 and further dynamically tracking and compensating for delay variations between two channels that are to be coherently combined to improve the signal to noise ratio for downstream receiving modems, including using the adaptive delay estimator.

17. The method of claim 16 and further including a coarse delay estimate between two input channels of a digital combiner via the adaptive delay estimator.

18. The method of claim 17 and further including determining the coarse and fine delay settings via an output of the adaptive delay estimator, the coarse delay determining a number of sample clock periods of delay and the fine delay setting selecting one set of fractional delay coefficients out of multiple sets of fractional delay coefficients stored in a coefficient memory.

19. The method of claim 18 and further including searching for the set of fractional delay filter coefficients proximate to the coarse delay estimate that minimize mean squared error between the two channels to be combined via the adaptive delay estimator.

20. The method of claim 19 and further including selecting combinations of coarse delay and fine delay settings via the adaptive delay estimator to update the mean squared error measurement from the digital combiner to determine the settings that minimize the mean squared error.

21. The method of claim 20 and further including tracking updated coarse delay estimates and mean squared error measurements via the adaptive delay estimator, tracking taking place after the minimum mean squared error has been discovered to adapt delay adjustments as needed to maintain minimum mean squared error.

22. The method of claim 16 and further including configuring a digital filter with a set of fractional delay compensation coefficients selected by the adaptive delay estimator.

23. The method of claim 22 and further including the digital filter using complex frequency domain coefficients to compensate for impairments of the signals that pass through the digital coherent combining system.

24. A system configured to generate the coefficients for a digital filter implemented on each channel of a multi-channel digital coherent combining system that concurrently performs bandlimiting, channel frequency equalization and fractional delay compensation, including:

(a) an intermediate frequency spectral measurement module for measuring the frequency response characteristics at an intermediate frequency channel output within the coherent combining system;

(b) a baseline coefficient generator;

(c) a fractional delay coefficient generator for deriving sets of coefficients based on a set from the baseline coefficient generator, each set providing a unique delay per channel of the coherent combining system that is a fraction of a sample clock period that when loaded in a digital filter, induces a fractional delay in the signal being filtered and unalters the equalizing and bandlimiting properties of a first set of coefficients; and (d) an adaptive delay estimator for selecting an incremental delay to optimize a signal-to-noise ratio when signals from different antennas are coherently combined.

25. The system of claim 24 wherein the intermediate frequency spectral measurement module includes weighted average filtering of equally spaced intermediate frequency spectral frequency measurements, each measurement acting on unique intermediate frequency signals specific to each channel of the coherent combining system.

26. The system of claim 25 and further including an intermediate frequency channel frequency response selector module for equalization and bandlimiting.

27. The system of claim 26 and further comprising a frequency response compensation coefficient module that calculates a set of frequency response compensation coefficients to compensate for the discrepancy between the measured and desired intermediate frequency response including equalization and bandlimiting.

28. The system of claim 27 and further including a compensation amplitude and time domain impulse response generator to equalize the channel.

29. The system of claim 28 wherein a baseband downconverter translates an impulse response generated by the impulse response generator from the passband to 0 Hz.

30. The system of claim 24 wherein a coefficient memory selects a set of coefficients to be used to create a desired fractional delay.

31. The system of claim 28 wherein the compensation amplitude and time domain impulse response generator includes a time domain sinusoid module for constructing a set of complex time domain sinusoids to represent the equalization and bandlimiting frequency response adjustments.

32. The system of claim 31 wherein the time domain sinusoid module includes a window function to weight the set and time and bandwidth limit each sinusoid.

33. The system of claim 31 wherein the time domain sinusoid module is configured to add complex time domain sinusoids at intermediate frequency passband band edges to adjust the characteristics of transitions to the stopbands.

34. The system of claim 33 wherein the compensation amplitude and time domain impulse response generator includes an adder to sum a set of weighted complex sinusoids to produce an intermediate frequency passband impulse response.

35. The system of claim 29 and further including a transformation module to transform the time domain impulse response at 0 Hz to the frequency domain to have a set of baseline frequency response compensation coefficients to equalize an existing intermediate frequency passband frequency response to be a desired baseline frequency response.

36. The system of claim 35 and further including a fractional delay coefficient generator for deriving sets of frequency domain coefficients from baseline frequency response compensation coefficients, each set with a delay specified as a fraction of a sample clock period and configured to not alter a desired baseline frequency response of the channel.

37. The system of claim 24 and further including a digital filter configured with a set of fractional delay compensation coefficients selected by the adaptive delay estimator.

38. The system of claim 37 wherein the digital filter is configured to use complex frequency domain coefficients to compensate for impairments of signals that pass through the digital combining system.

39. The system of claim 38 and further including dynamically tracking and compensating for delay variations between two channels that are to be coherently combined to improve the signal to noise ratio for downstream receiving modems, including the adaptive delay estimator to provide a coarse delay estimate between two input channels of a digital combiner.

40. The system of claim 39 wherein the adaptive delay estimator is configured to output coarse and fine delay settings, the coarse delay being a number of sample clock periods of delay and a fine delay setting including one set of fractional delay coefficients selected from multiple sets of fractional delay coefficients stored in coefficient memory.

41. The system of claim 40 wherein the adaptive delay estimator is further configured to search for the set of fractional delay filter coefficients proximate a coarse delay estimate that minimize mean squared error between the two channels to be combined.

42. The system of claim 41 wherein the adaptive delay estimator is further configured to combine coarse delay and fine delay settings to update mean squared error measurement from the digital combiner to minimize the minimum mean squared error.

43. The system of claim 42 wherein the adaptive delay estimator is further configured to track updated coarse delay estimates and mean squared error measurements after the minimum mean squared error has been computed to adapt delay adjustments and maintain minimum mean squared error.

44. The system of claim 39 wherein a digital filter is configured with a set of fractional delay compensation coefficients selected by the adaptive delay estimator.

45. The system of claim 44 wherein the digital filter is configured to use complex frequency domain coefficients to compensate for impairments of signals that pass through the digital combining system.

* * * * *